June 20, 1967  E. A. SCHMIDT  3,326,414
HOOK AND EYE ATTACHING APPARATUS
Filed June 17, 1965  2 Sheets-Sheet 1

INVENTOR.
ERICH A SCHMIDT
BY R. E. Meech
ATTORNEYS.

June 20, 1967  E. A. SCHMIDT  3,326,414
HOOK AND EYE ATTACHING APPARATUS
Filed June 17, 1965  2 Sheets-Sheet 2
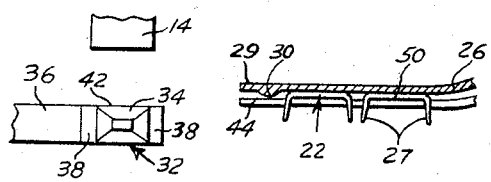
Fig. 2
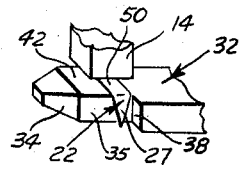
Fig. 3
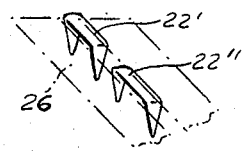
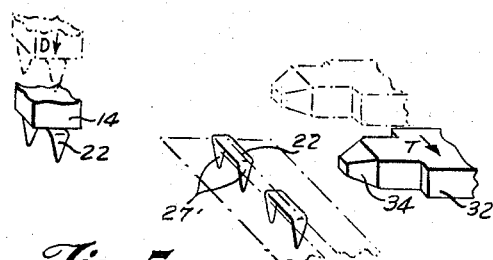
Fig. 4  Fig. 5
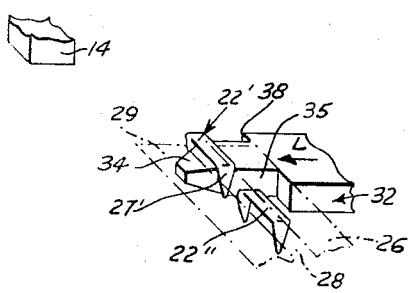
Fig. 6
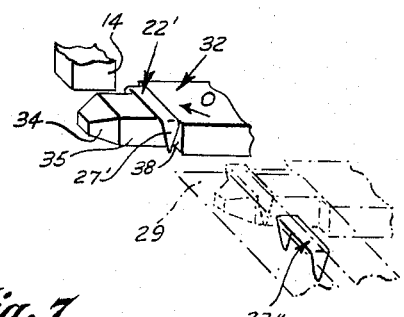
Fig. 7
INVENTOR.
ERICH A. SCHMIDT
BY R. E. Meech
ATTORNEYS.

United States Patent Office 3,326,414
Patented June 20, 1967

3,326,414
HOOK AND EYE ATTACHING APPARATUS
Erich A. Schmidt, Lexington, Ky., assignor of one-half to Universal Button Company Division of Talon, Inc., Lawrenceburg, Ky., a corporation of Kentucky
Filed June 17, 1965, Ser. No. 464,701
13 Claims. (Cl. 221—262)

This invention relates to apparatus for transporting elements from one station to another; and, more particularly, to apparatus for transporting pronged elements from a guideway to a plunger which secures the element to an article.

Generally, pronged elements which are to be attached to an article have been fed directly to a position substantially in alignment with the axis along which a reciprocally movable plunger is actuated. This has been accomplished in at least two ways, one being a plunger having a hollow bore through which the element can be fed, and the second being a guideway for carrying a plurality of elements the exit of which terminates in a position such that the foremost element is placed both directly above that portion of the article to which it is to be attached, and in alignment with the path of the plunger such that the plunger in ramming the element into engagement with the article, simultaneously removes the element from the exit of the guideway. Each of these two methods are objectionable. In the first, the elements have a tendency to easily jam within the bore preventing elements from being fed to the base of the plunger and making it difficult for the operator to clear the bore; and, in the second, the guideway tends to obscure the operator's view for properly positioning the element in relation to the article prior to actuation of the plunger. It is to an improved apparatus and method for transportation a pronged element from the exit of a guideway to the base of the plunger that the present invention is directed.

It is the general object of the present invention to provide apparatus for transporting a pronged element from one station to another.

Still another object of this invention is to provide apparatus which carries a pronged element from a guideway and places it on a plunger member in a properly oriented positioned prior to actuation of the plunger.

Another object of this invention is to provide an improved method of engaging and transporting a pronged element from a guideway to the base of a plunger member prior to being secured to an article.

Other objects and a fuller understanding of the invention can be had by referring to the following description and claims taken in conjuction with the accompanying drawings in which:

FIG. 2 is an enlarged end view, partly in cross section of the guideway, carrier and plunger of the machine shown in FIG. 1; and, FIGS. 3–7 are perspective schematic views of the apparatus of this invention illustrating the mode of operation thereof.

Figure 1:
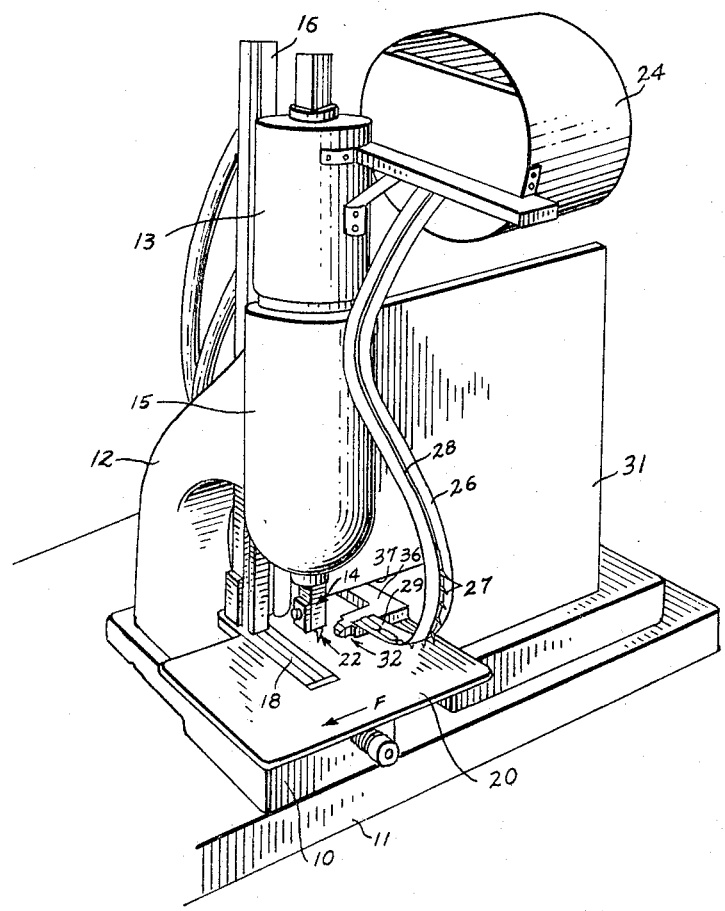
FIG. 1 is a perspective view of a machine embodying the apparatus of this invention.

The machine shown in FIG. 1 is similar in operation and construction to the machine illustrated and described in U.S. Patent No. 3,065,470 and includes a horizontal base 10 which can be mounted on a stand 11 at any convenient height. An arcuate support member 12, forming an upright portion of base 10, supports an air cylinder 13 which contains a piston therein (not shown). The base of piston includes a plunger 14 which is adapted to move with a reciprocal motion along a vertical axis. Behind the air cylinder 12 there is located an upright base plate carrier 16 which supplies base plates in a known manner to an anvil 18, located below the upper surface of the table 20 of the machine, and in alignment with the axis within cylindrical housing 15 along which plunger 14 is adapted to move. The operator of the machine places an article on table 20 and, by suitable mechanism, actuates air cylinder 13 such that plunger 14, which carries a pronged hook or eye 22, moves downwardly towards the base plate and anvil 18 to clench a hook or eye 22 to the base plate when the article such as a garment is moved across table 20 in the direction F and interposed therebetween.

A rotating hopper 24, which carries a plurality of pronged hook or eye member 22, is supported on the upper end of cylinder 13. A guideway or raceway 26 receives the pronged eye members 22 in such a manner that their prongs 27 protrude outwardly from a slot 28 in guideway 26. Each hook or eye 22 will be oriented in the same manner within guideway 26 and carried to the exit end 29 thereof.

As best shown in FIGS. 1 and 2, the inner surface at the exit end 29 of guideway 26 includes a raised detent portion 30, which will retain eyes 22 in guideway 26 and prevent the same from spilling out.

The exit end 29 of guideway 26 is positioned to the right side of plunger 14 as viewed in FIG. 1 and is spaced from a support plate 31 a greater distance than is the plunger 14. A carrier member 32, which includes a truncated nose portion 34 at the tip of a box-like extension 35, is supported on an arm member 36 which projects outwardly from an aperture 37 in support plate 31 of the machine. A shoulder 38 projects outwardly from each opposite side of carrier 32 and is part of arm 36. Carrier 32 is actuated by any suitable mechanism such as cams (not shown) such that it will move in a horizontal plane and describe an oscillating path (more fully described hereinbelow) relative to the vertical axis along which plunger 14 reciprocates. Carrier member 32 moves in this horizontal plane in a manner such that the upper surface 42 of extension 35 moves beneath and very close to the lower track 44 of guide way 26 at its exit end 29.

The mode of operation of the apparatus as well as the method of transporting pronged elements can best be described with reference to FIGS. 3–7 wherein two eyes 22' and 22" are positioned in guideway 26, which for present descriptive purposes is shown in phantom line. To best describe the operation, a first eye 22 is located on surface 42 of extension 35 of carrier member 32 in a manner so that a suitable pick-up device, such as a magnet or the like, on plunger 14 will receive eye 22. The rear edges of the prongs 27 of eye 22 are each in abutting engagement with their respective shoulder member 38 formed on carrier member 32 with the bright portion 50 of eye 22 lying flush with the upper surface 42 of extension 35 of carrier member 32. When the operator initially actuates the machine, carrier member 32 retracts directly to the right in the direction R away from plunger 14 and, because eye 22 is held by plunger 14 and the prongs 27 thereof straddle carrier member 32, the eye member will be left in operative engagement with the bottom surface of plunger 14.

As shown in FIGS. 4 and 5, once carrier member 32 is retracted from under plunger 14, plunger 14 subsequently starts on its down stroke in the direction D to move eye 22 into attaching engagement with the article as well as the back plate (not shown). The action of the prongs in moving eye 22 into clenching engagement with the article and back plate is well known in the art and does not form a part of this invention.

Carrier member 32 is retracted to a position to the right of the exit end 29 of guideway 26 at which position the actuating mechanism of the machine moves the carrier member 32 in a transverse direction T to place it in a position substantially directly to the right of eye member 22' which is now in the foremost position in guideway 26.

As best shown in FIGS. 6 and 7, the carrier member then moves to the left in the direction L substantially parallel to the support plate 31 of the machine and into a position such that nose portion 34 is positioned intermediate the downwardly depending prongs 27' of eye 22'. Once prongs 27' of eye member 22' straddle nose portion 34 of carrier member 32, the direction of the carrier member is changed to move in an oblique direction 0 which is substantially towards plunger 14 and away from exit end 29 of guideway 26. In moving away from exit end 29 of guideway 26, extension portion 35 exerts a force on prong 27' which will override the force of detent 30 and urge eye member 22 out of the slot 28 at exit end 29 of guideway 26. Simultaneously, eye member 22' is inserted further onto extension 35 of carrier member 32 such that when the prongs 27' are clear of exit end 29, the rear edges of prong members 27' will be in engagement with shoulders 38 on carrier member 32. The carrier member 32 continues in its oblique path until it is directly to the right of plunger 14 at which time it then advances to the left along an axis parallel to the plane of support plate 31 until eye member 22' is directly beneath plunger 14. At this point, a retention mechanism, such as a magnet on plunger 14, will attract and retain eye member 22' in engagement with plunger 14 and the cycle can be repeated at the discretion of the operator.

In the meantime, eye member 22" will slide down guideway 26 until it engages detent 30 at which point its movement is stopped and it is kept in operative position ready for the next actuation of the machine by the operator.

It should be noted that shoulders 38 on carrier member 32 will engage the rear edge of prongs 27 of eye member 22 to properly orient the eye member 22 relative to the plunger 14 such that eye member 22 is always placed on plunger 14 in the same relative position.

It should be obvious that while the description has been specifically described relative to an eye member, any other double prong member such as a hook is equally suitable for being transported from the guideway 26 to the base of plunger 14.

In addition, this particular mechanism and method of transporting a pronged element to the plunger readily permits an operator to view the area where the pronged element is to be attached to an article, because the guideway 26 is removed from the direct line of vision of the operator and since a pronged member is already positioned on the plunger, the operator can readily position the pronged member in alignment with the proper place of application.

The invention has been described in detail with particular reference to one embodiment of the invention, but it will be understood that variations and modifications can be effected with the spirit and scope of the invention as described hereinabove and as defined in the appended claims.

I claim:

1. Apparatus for feeding pronged elements to a reciprocal plunger of an attaching machine, comprising:
    means for guiding a plurality of pronged elements in sequence from a supply to an exit position spaced to the rear and to one side of said plunger with all of the pronged members of said elements oriented to be located substantially in alignment with each other;
    carrier means for transporting the foremost pronged element from said exit position of said guide means to the base of said plunger in which said carrier means advances from a rearmost position behind said foremost pronged element in a direction transverse to the axis of alignment of the pronged members, and adapted to enter that space intermediate adjacent spaced pronged members of said foremost pronged element to place that pronged member nearest said plunger intermediate said carrier means and said plunger, after which said carrier means moves in an oblique direction towards said plunger and away from said guide means to first urge said element out of said guide means and then move it to an operative position relative to said plunger wherein said element can be secured to an article on the downstroke of said plunger.

2. The apparatus of claim 1 wherein said guiding means adjacent its exit end extends along a given axis and said pronged elements move along said axis to said exit position, said axis spaced from said plunger and located intermediate the rearmost position in said path of said carrier means and said plunger.

3. The apparatus of claim 2 wherein said guiding means adjacent its exit end includes a detent means for engaging successive pronged elements whereby only the foremost pronged element can be removed from said guide means by said carrier means.

4. The apparatus of claim 2 wherein said pronged element includes at least two spaced pronged members and said carrier means supports said pronged element intermediate its pronged members when transporting said pronged element to said plunger.

5. The apparatus of claim 4 wherein said carrier means is initially inserted between said pronged members of said foremost pronged element and then moves toward said plunger to bear against said pronged member located intermediate said carrier means and said plunger whereby said foremost pronged element is moved out of the exit end of said guiding means.

6. The apparatus of claim 5 wherein said carrier means includes a nose portion for entering the space intermediate said pronged members.

7. The apparatus of claim 4 wherein said means for supporting said foremost pronged element has a surface which corresponds substantially to the lower surface of the bight portion of said pronged element located intermediate said spaced pronged members of said pronged element.

8. The apparatus of claim 6 wherein said nose portion of said carrier means first moves intermediate said prong members of said pronged element after which said carrier means moves in an oblique path towards said plunger to initially move said foremost element from said exit end of said guiding means and place said element on said carrier means with said pronged members straddling said carrier means.

9. The apparatus of claim 8 wherein said carrier means moves in said oblique path to place said pronged element on the surface for supporting said pronged element when said pronged member is moved out of the exit end of said guiding means.

10. The apparatus of claim 9 wherein said carrier means includes a shoulder on each side of said carrier means for supporting said pronged element when it is removed from said exit end of said guiding means.

11. The apparatus of claim 10 wherein said shoulders on each side of said carrier means engages the edges of said pronged members to orient said pronged element relative to said plunger.

12. The method of transporting a double pronged element on a carrier member from the exit end of a guideway which is spaced from the plunger of an attaching machine with the axis of said guideway at said exit end located to one side of said plunger such that said carrier member can move from a first position under said plunger in a direction transverse to said axis without passing said guideway, the steps of:
    (a) retracting said carrier member in a direction transverse to said axis and in a horizontal plane from said first position to a second position on the opposite side of said axis from where said plunger is located;

(b) moving said carrier member to a position directly in alignment with the axis located intermediate and equidistant from the pronged members of said pronged element;

(c) inserting said carrier member into a position below the lower surface of said guideway such that said pronged members of said pronged elements straddle said carrier member;

(d) directing said carrier member through an oblique path towards said plunger and away from said exit end of said guideway to both move said pronged element out of the exit end of said guideway and to move said pronged element into a seated and oriented position on said carrier means as said pronged element is disengaged from said exit end of said guideway; and (e) advancing said carrier means carrying said pronged element into position relative to said plunger for discharging said pronged element.

13. The method of transporting a double pronged element on a carrier member from the exit end of a guideway which is spaced from the plunger of an attaching machine with the axis of said guideway at said exit end located to one side of said plunger such that said carrier member can move from a first position under said plunger in a direction transverse to said axis without passing under said guideway, the steps of:

(a) moving said carrier member in a path from said first position to a second position on the opposite side of said axis from where said plunger is located, said second position being substantially directly in alignment with the axis located intermediate and equidistant from the pronged members of said pronged element;

(b) inserting said carrier member into a position below the lower surface of said guideway such that said pronged members of said pronged elements straddle said carrier member;

(c) directing said carrier member through an oblique path towards said plunger and away from said exit end of said guideway to both move said pronged element out of the exit end of said guideway and to move said pronged element into a seated and oriented position on said carrier means as said pronged element is disengaged from said exit end of said guideway; and (d) advancing said carrier means carrying said pronged element into position relative to said plunger for discharging said pronged element.

References Cited

UNITED STATES PATENTS

| | | | |
|---|---|---|---|
| 901,434 | 10/1908 | Fraser | 221—262 |
| 1,118,312 | 11/1944 | Smith et al. | 227—116 X |
| 2,373,436 | 4/1945 | Treciokas | 227—114 X |

SAMUEL F. COLEMAN, *Primary Examiner.*